Nov. 20, 1962 P. M. G. TOULON 3,065,294

TELEVISION SYSTEM FOR HIGH DEFINITION AND SECRECY OF IMAGE

Original Filed March 11, 1950 7 Sheets-Sheet 1

INVENTOR

PIERRE MARIE GABRIEL TOULON

BY Moore & Hall

ATTORNEYS

TELEVISION SYSTEM FOR HIGH DEFINITION AND SECRECY OF IMAGE

Original Filed March 11, 1950 7 Sheets-Sheet 2

SCANNING SEQUENCE

INVENTOR
PIERRE MARIE GABRIEL TOULON
BY Mason & Hall
ATTORNEYS

TELEVISION SYSTEM FOR HIGH DEFINITION AND SECRECY OF IMAGE

Original Filed March 11, 1950 7 Sheets-Sheet 3

INVENTOR
PIERRE MARIE GABRIEL TOULON
BY Moore & Hall
ATTORNEYS

TELEVISION SYSTEM FOR HIGH DEFINITION AND SECRECY OF IMAGE

Original Filed March 11, 1950 7 Sheets-Sheet 4

INVENTOR
PIERRE MARIE GABRIEL TOULON
BY Moore & Hall
ATTORNEYS

Nov. 20, 1962 P. M. G. TOULON 3,065,294

TELEVISION SYSTEM FOR HIGH DEFINITION AND SECRECY OF IMAGE

Original Filed March 11, 1950 7 Sheets-Sheet 5

INVENTOR

PIERRE MARIE GABRIEL TOULON

BY [signature]

ATTORNEYS

TELEVISION SYSTEM FOR HIGH DEFINITION AND SECRECY OF IMAGE

Original Filed March 11, 1950

INVENTOR

PIERRE MARIE GABRIEL TOULON

BY Moore & Hall

ATTORNEYS

TELEVISION SYSTEM FOR HIGH DEFINITION AND SECRECY OF IMAGE

Original Filed March 11, 1950

7 Sheets-Sheet 7

INVENTOR

PIERRE MARIE GABRIEL TOULON

BY Moore & Hall

ATTORNEYS

United States Patent Office 3,065,294

Patented Nov. 20, 1962

3,065,294

TELEVISION SYSTEM FOR HIGH DEFINITION AND SECRECY OF IMAGE

Pierre Marie Gabriel Toulon, Pittsburgh, Pa., assignor, by mesne assignments, to Moore and Hall, Washington, D.C., a partnership Continuation of application Ser. No. 149,062, Mar. 11, 1950. This application Dec. 28, 1955, Ser. No. 555,837
Claims priority, application France Mar. 22, 1949
18 Claims. (Cl. 178—5.1)

The present invention concerns television methods, apparatus and systems and provides means for greatly improving the quality of television pictures and for maintaining the transmission thereof secret.

This application is a continuation of my application Serial No. 149,062, filed March 11, 1950, with the same title.

This invention relates to a process permitting the horizontal and vertical shift of each successive frame according to a certain regular law. If this law is the same at the electronic camera of the sending station and on the cathodic or flat wall type tube of the receiver, the picture appears correctly; in the other cases, the image appears totally confused.

The invention refers to television apparatus in which the exploration either in transmission or reception is effected by means of a movable cathode beam. It especially refers to apparatus, either transmitting or receiving, in which the exploration is effected by the displacement and pulse modulation with or without interruption of the electron beam. The pulse modulation here referred to is superimposed upon the picture signal and either shuts off the electron image during displacement or modulates it so near cut-off that no readily discernible trace appears on the screen during the actual displacement of the beam.

The problems of reduction of flicker, improvement in sharpness and resolution are referred to in U.S. Patent No. 2,479,880 to which reference is made with regard to such terminology as "sweeping" and "exploration" or "scanning," as well as for the basis and pioneer construction and operation for "discontinuous interlaced scanning" more popularly known as "dot interlace" which, as application Serial No. 151,806 (now Patent No. 2,587,908), was copending with the present application by virtue of the French cognate application No. 569,609 filed March 22, 1949, now French Patent No. 986,834, on which the present application is based. Reference is also made to my closely related copending application Serial No. 237,372 filed July 18, 1951 (now abandoned), in which the emphasis is placed on similar means for reducing "color crawl" which can be a serious defect in television. The present invention, when properly employed, can reduce or eliminate this objectionable phenomenon.

The present invention is not limited in its application to cathode ray tubes, but is equally adaptable for use with my wall type flat screens for television such as are described in my copending applications S.N. 266,514 filed January 15, 1952, for Mural Screen Television (now Patent No. 2,760,119); S.N. 231,095 filed June 12, 1951, for Television Tube; S.N. 508,144 filed May 13, 1955, for Improvements in Television With Reference to Color (now abandoned); my U.S. Patents 2,201,066; 2,471,253 and others.

In the field of color television where so much information must be transmitted the invention greatly increases the efficiency of use of bandwidth.

When applied to receiving, the action in accordance with the invention consists of a more or less complete modulation of the beam intensity, that is the cathode beam is caused to appear and disappear periodically or in a selected sequence on a swept line. This action may be accomplished by keying or pulse modulating the electron beam in the receiver. Much the same effect can be obtained in some applications by keying the picture signal at the transmitter or pulse modulating the transmitted picture signal so greatly that no effective signal appears on the receiver screen. In this case the pulse modulation cut-off during displacement is part of the received picture signal and may require no keying or pulse modulating means in the receiver.

The displacement of the beam in accordance with the invention is preferably periodical, the different points of each line being explored by skipping over an equal number of points on the same line or different lines each time. The skipped points are normally explored in turn. Where the speed of sweeping is constant the keying or pulse modulation of the beam is done by changing the potential of an electrode such as the control grid of the cathode ray tube.

As stated above, the present invention presents a new process by which television broadcasts may be secret. One method of achieving this result is to render the television broadcasts unintelligible when received by the normal receiving set and to enable those who know the indications corresponding to the key to receive the telecast clearly and accurately.

This phase of the invention is particularly applicable to arrangements where it is desired to broadcast programs to a limited number of select stations. In one form of the invention only these sets receive comprehensible images and all others receive only badly blurred and unintelligible image sequences. Such an arrangement may also have value in the national defense where code integrity is of more than just commercial importance.

It is an object of the invention to divide the lines of image into suitable groups each comprising a certain number of lines, to explore the lines in each group in a certain selected order making several successive sweepings for each image and to make an analogous sweeping at the receiving station in synchronism with the sending station.

It is an object of the invention to act on the cathode beam tube in a periodic manner in such a way as to produce successive discrete points separated from each other on a television receiving screen, to divide the entirety of the elemental points of the image into a certain number of groups or elementary "draught boards" each one comprising a certain number of elemental points or "squares," to explore the image as many times as there are points or squares in each group or "draught board," to modify the order of exploration during the course of each sweeping, to make the number of sweepings for each image substantially equal to the number points or "squares" in each group or "draught board," a different point or "square" being scanned in each group or "draught board" for each sweeping or exploration.

It is an object of the invention to modify in the course of time at the broadcasting station the position of the points explored on each of the successive images of the object televised and to effectuate at selected receiving stations a similar modification in synchronism therewith.

It is an object of the invention to displace at the sending station all or a large number of selected points of each image, following a certain sequence and cadence, of one or several unities or "squares" along with the ordinate, abscissa or both, simultaneously or sequentially and to displace in the reverse sense in synchronism or to restore the position of the points at the receiving station.

It is an object of the invention to provide a television scanning system which is compatible for color and black and white.

It is an object of the invention to provide a means for signal transmission which makes efficient use of a given bandwidth.

It is an object of the invention to explore a tube face discontinuously as for example point-by-point. The tube face may be coated with a mono-chrome phosphor, or mixed phosphor or it may have two or three color phosphors laid on in sequential lines or dots. The last is preferred.

It is an object of the invention to explore a phosphor screen or tube face discontinuously one or more dots at a time, either on the same line or different lines, at equal or different distances apart.

To obtain different effects in (1) to modify the relative position of successive images, (2) to modify the relative position of the successive lines explored or (3) to modify the relative position of successive points, it is proposed to act upon the deviating system of the electron beam of the television camera at the transmitting station and to act in synchronism on the deviating system of the cathode beam of the receiver.

According to one form of the invention it is proposed to employ distributors, at both the sending and receiving station, synchronized with each other to furnish at a predetermined sequence or cadence, voltages or currents of known value. In the case of a cathode ray tube with electrostatic deviation the voltages are applied to the deflection means so as to modify the value of deflection following a certain sequence or cadence. Currents are used in the case of tubes with magnetic deviation. The choice of the order of these deviations and their amplitude are established in conformity with a "key" fixing the values of the voltages or currents. Such a key is utilized in synchronism at the sending and receiving stations and may be obtained at each station by choosing numbers on dials connected to potentiometers which determine the values of the voltages or currents to deviate the electron beam.

According to the invention the order and the amplitude of the voltages or currents may be determined from a "key" comprising a card, a tape which may be magnetic or plain, or paper which may be perforated, embossed, provided with a curved edge having cam-like projections, or printed with conducting ink or the like. For this purpose a sheet of insulating paper may have imprinted upon it a certain number and arrangement of conducting areas or beaches. Such a sheet may be clamped to a registering device which controls the position of the holes or conducting imprinted deposits with respect to time. These registering devices which may move in accordance with any given law which may in itself be changed, are supplied by an exterior source and furnish in a determined order or sequence at the proper time the different voltages or currents. The registering devices may be regarded as gates or switching means.

Where desired for more simple commercial applications, the card itself may control the character such as timing and amplitude of the deflecting voltages or currents by a suitable choice of outline, holes or imprinted areas. This form of the invention may be called key-selection television; the order of exploration constituting a key which causes the signal to form an image intelligible on the screen of only those receivers having the key. The key may be changed very easily by replacing a card having one control arrangement with that of another corresponding to the new key.

The key selection concept and apparatus is also applicable to large screen television as disclosed in my copending U.S. Patents Numbers 2,541,133; 2,558,019; 2,595,617; 2,760,119; 2,848,536; 2,940,005; and 2,967,904.

Many changes may be made in the various characteristics without departing from the spirit of the invention. The specific examples described below are illustrative only of some forms the invention may take and are not to be construed as limiting.

In the drawings like part numbers refer to like parts throughout. Numbers referring to elemental points in groups will be treated separately and spelled out to avoid confusion.

Figures 6, 6A:
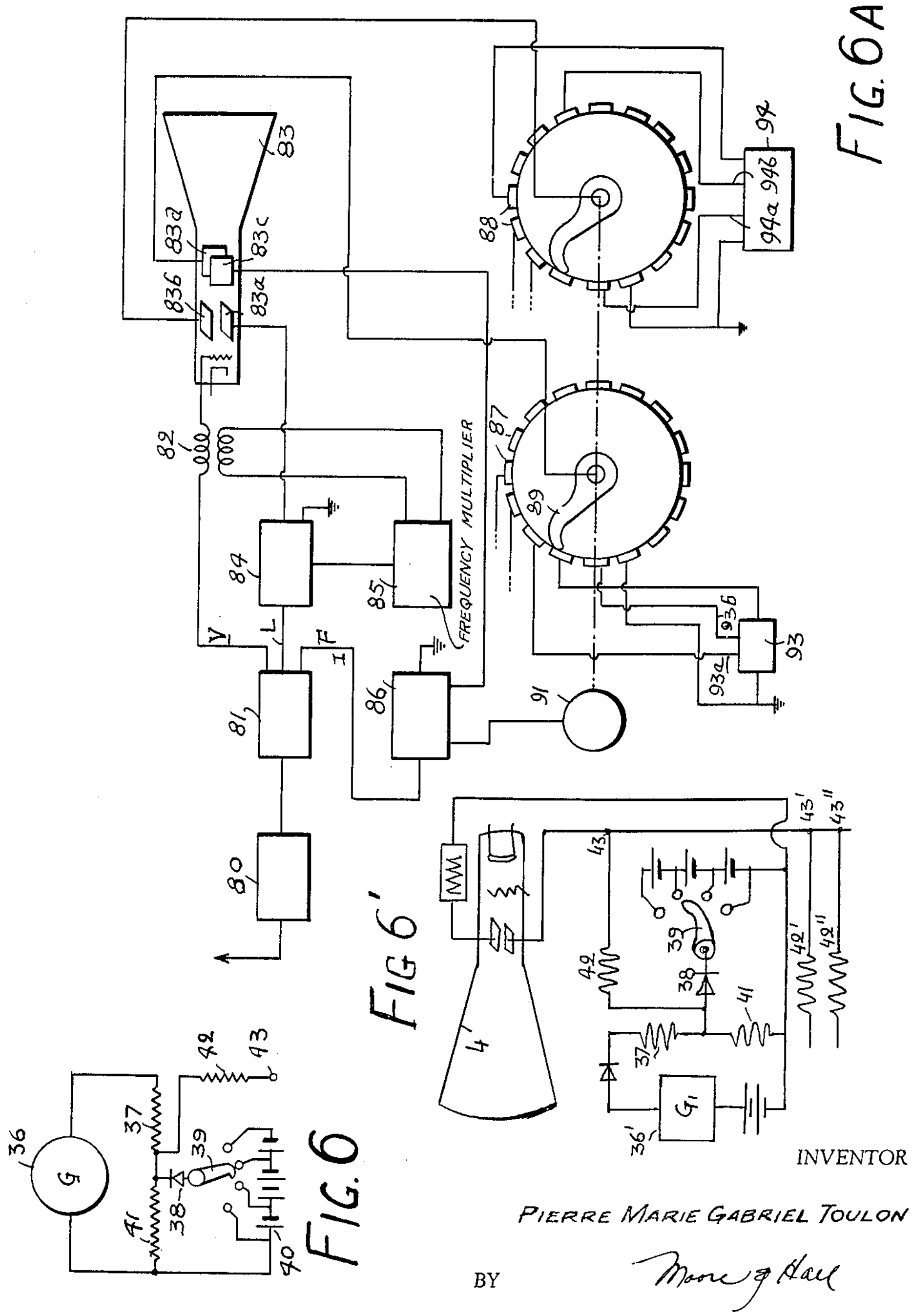
FIGURE 6 is a circuit diagram for obtaining dot interlace scanning according to the invention as part of a system providing secrecy of image.

FIGURE 6′ is a working diagram showing how the unit circuit of FIGURE 6 is employed by multiples in parallel and with certain elements indicated for clarity which in FIGURE 6 are taken as part of the generator symbol.

FIGURE 6A is a further development of the circuit of FIGURE 6 providing a circuit for obtaining dot interlace scanning according to the invention.

Figure 6B:
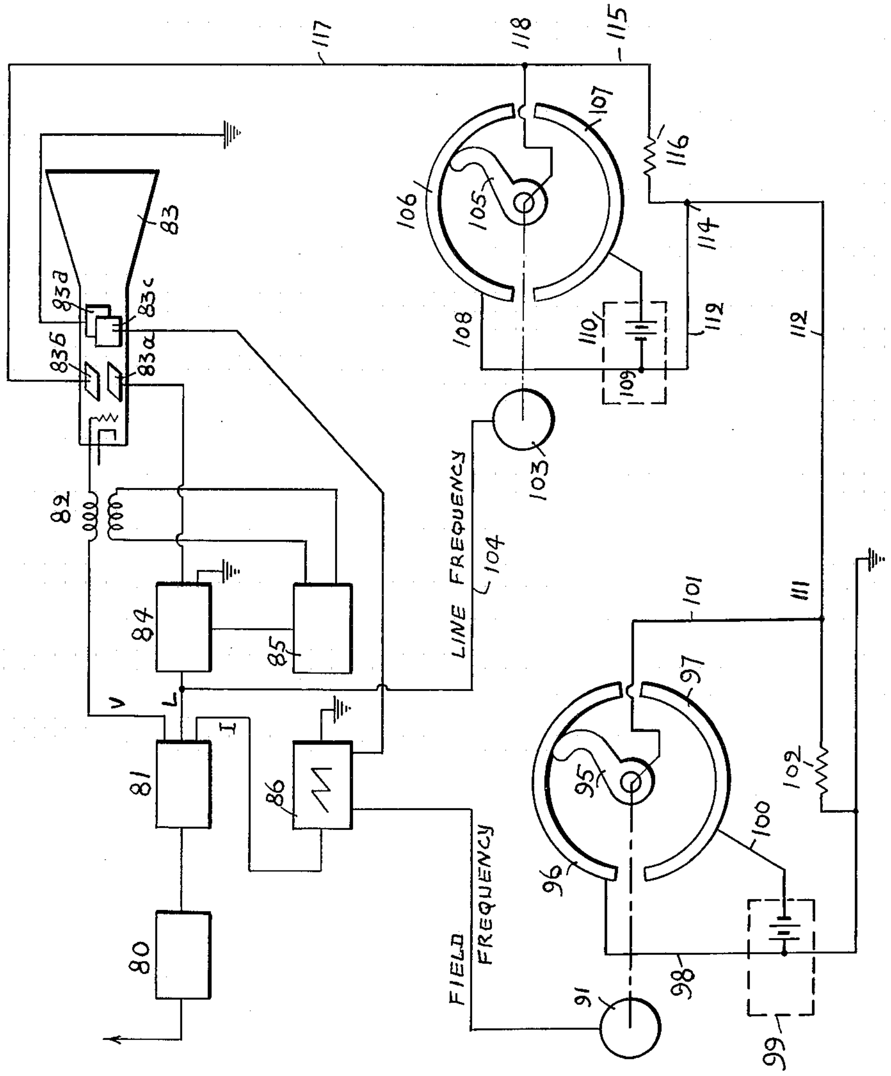

FIGURE 6B is another form of circuit for obtaining dot interlace scanning, according to the invention.

Figure 6C:
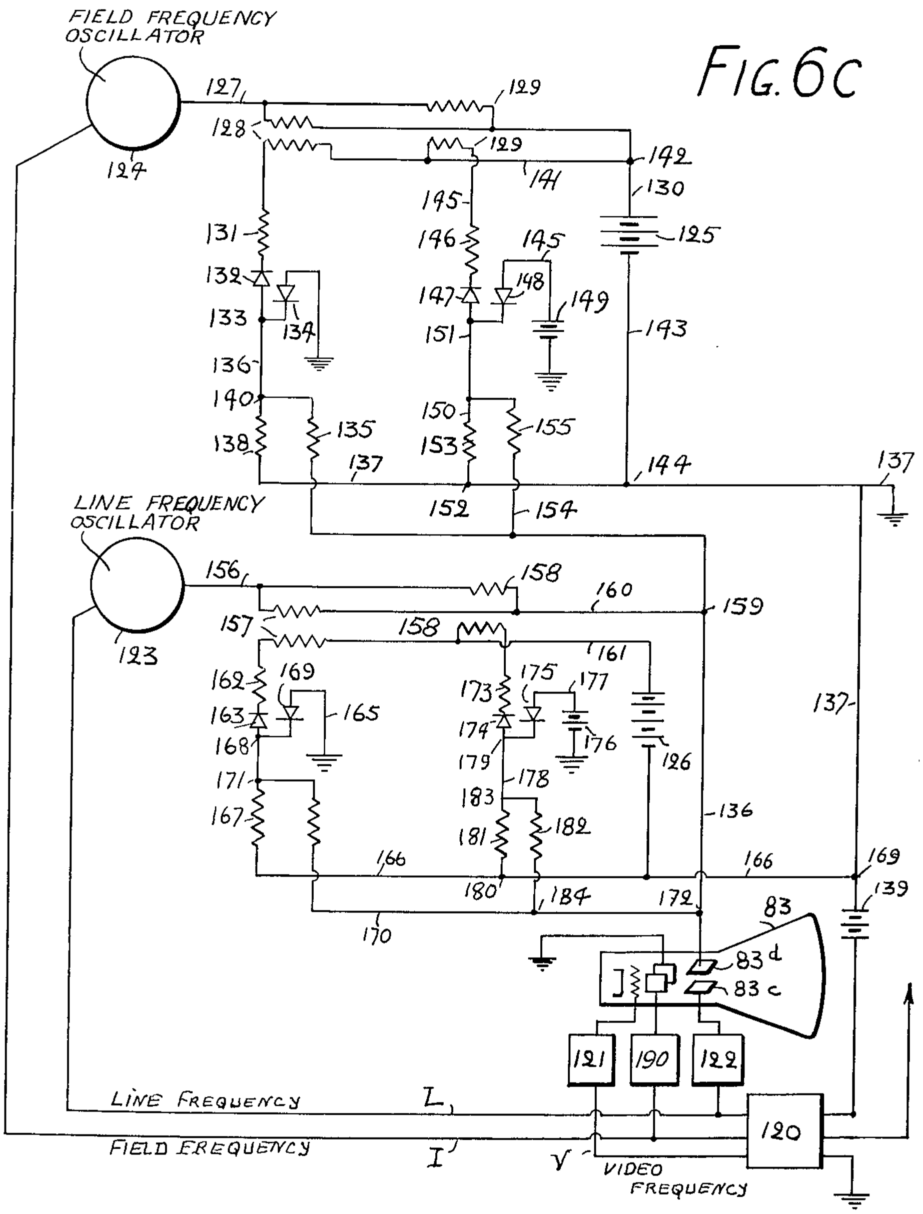

FIGURE 6C is another form of circuit for obtaining dot interlace scanning according to the invention.

Figure 7:
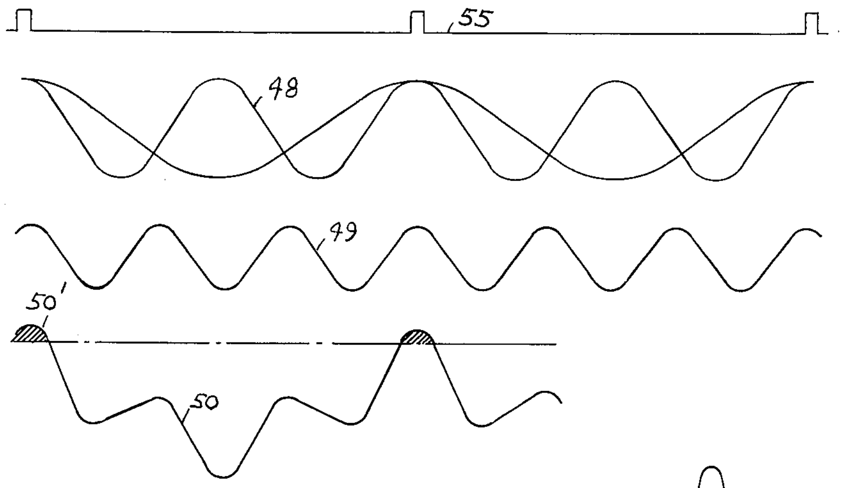

FIGURE 7 is a wave diagram on a time base showing how deflection voltages may be created and their relationship to synchronization pulses.

Figure 8:
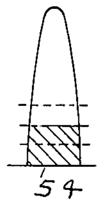
Figure 9:
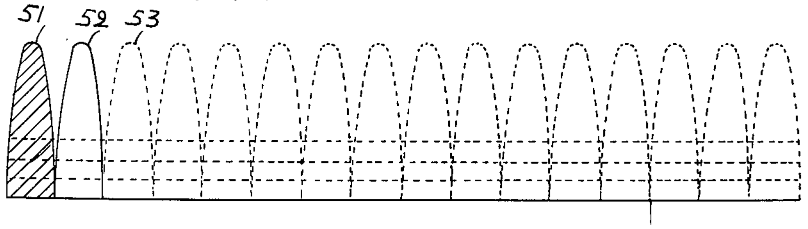

FIGURES 8 and 9 are schematic diagrams of related control voltages.

Figures 10, 11:
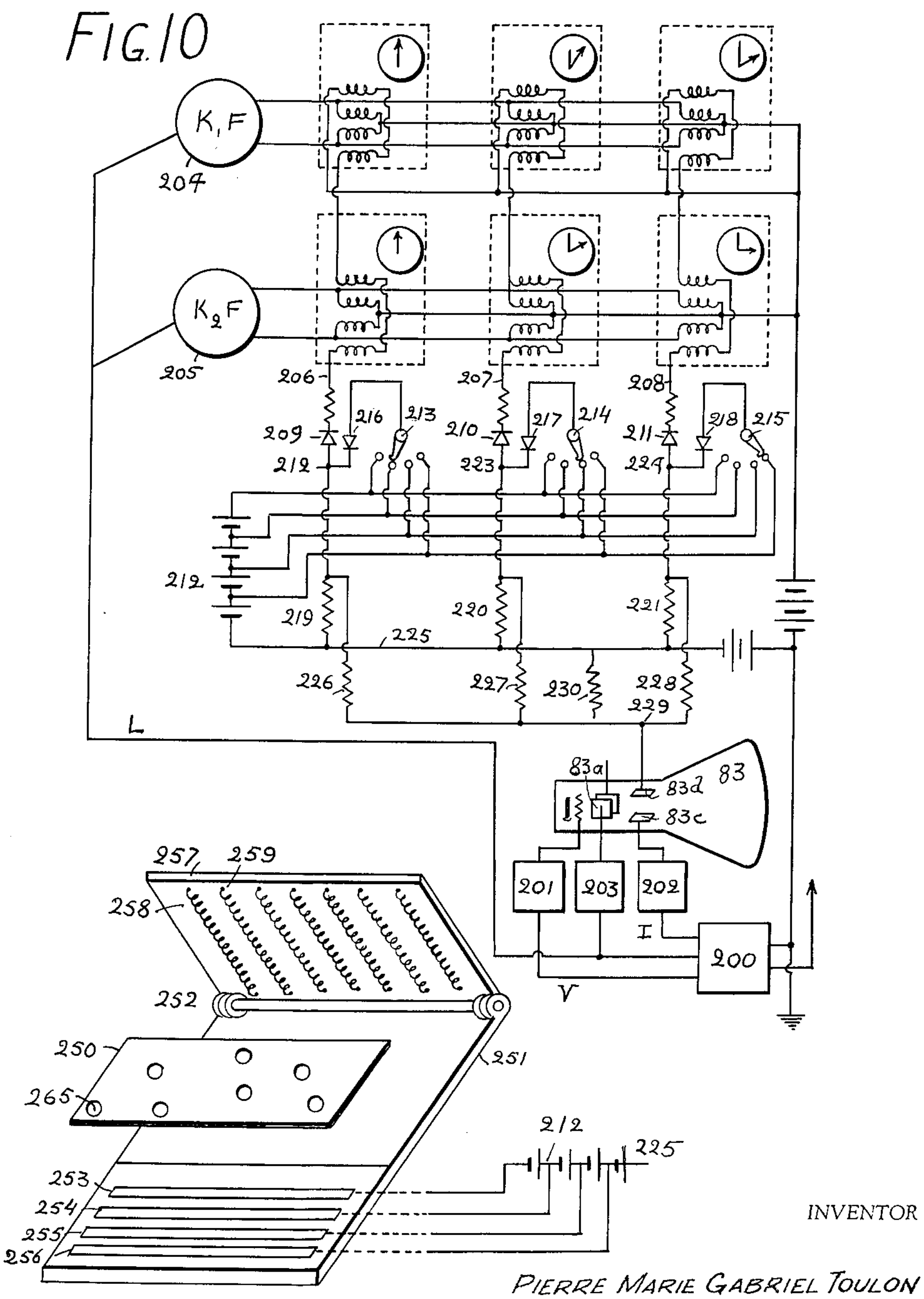

FIGURE 10 is a diagram of one form of circuit for producing the different key voltages to control the beam according to the invention.

FIGURE 11 shows one arrangement by which a perforated key selection card may be used.

By applying appropriately selected values of voltage, e.g. 0 v., 5 v., 1 v., to the vertical deflecting plates of a cathode ray tube or other electron or charged particle flow control means, it is possible to key and to unkey the image by a shift of one, two or three lines up or down as desired. In the same manner a one, two or three point shift to left or right may be obtained. In the case of magnetic deflection currents of these relative values are used. It will be seen that for any one instant by the use of the above values for both horizontal and vertical deflection a point of image can be displaced in at least twenty-five different practical ways. This number permits with possible variations in time sequence of these values, a large number of possibilities.

Figures 1, 2:
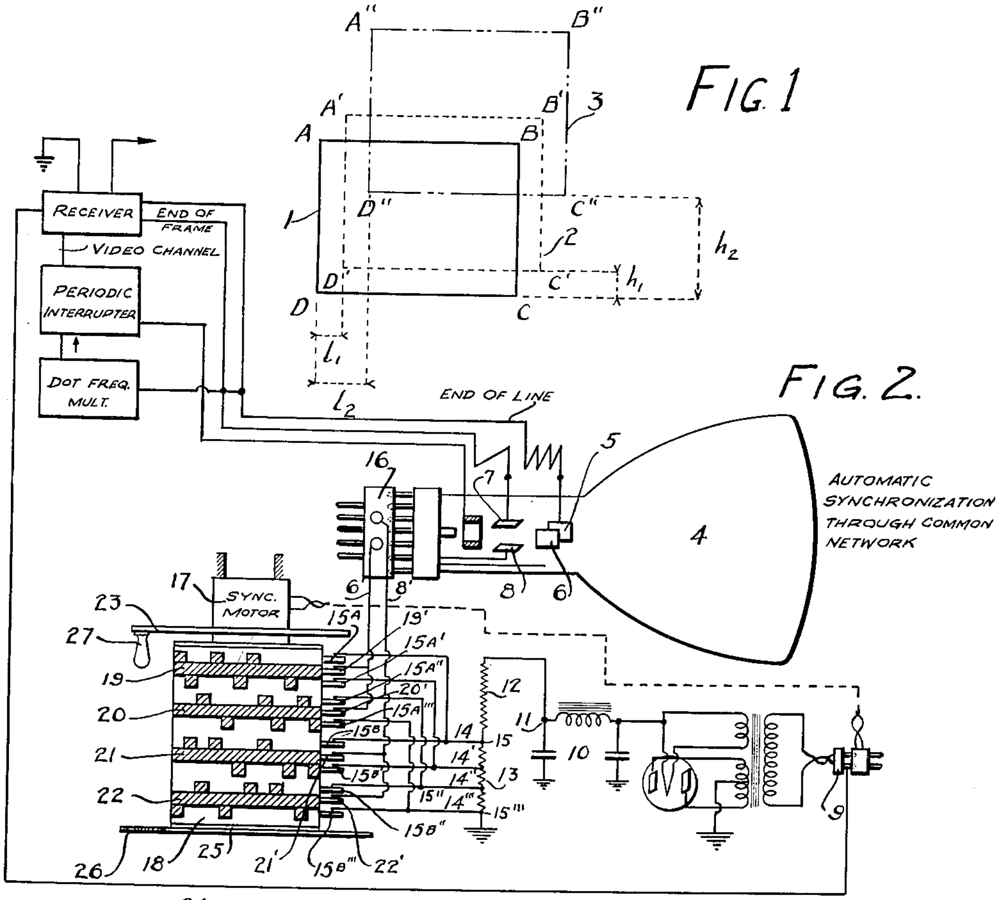
FIGURE 1 is a schematic diagram showing displacement of an image at a sending station and its decoding adjustment at the receiving station.
FIGURE 2 is a schematic circuit diagram for one form of key select receiver.

In FIGURE 1, A, B, C, D show the normal image. If a voltage of 0 v., 5 v. is applied, for example, to the vertical deflection plates of a cathode ray tube, a displacement $h_1$ is obtained and if a voltage of 0, 5 v. is applied to the horizontal deflection plates a displacement $l_1$ is obtained. The combined displacement yields the displaced image 2 shown by A′, B′, C′ and D′ which is "keyed" in relation to image 1 and is not superimposable thereon to produce a clear image.

If a value of vertical voltage 1, 5 v. and a value of horizontal voltage 1 v. is used, yielding deflections of $h_2$ and $l_2$ respectively, an image 3 shown by A″, B″, C″, D″ is obtained which is likewise keyed in relation to images 1 and 2 and will not superimpose on either image 1 or 2 to produce a clear image.

It follows that if these images are combined they will produce a blurred or, if desired, entirely unintelligible resultant "image." For example, if the image of A′, B′, C′, D′ appears in the frame, A, B, C, D, after a short interval, i.e. 1/50 second, a serious blurring of the picture occurs as clarity and definition are lost and garbling occurs. The superimposing of image A″, B″, C″, D″ on frame A, B, C, D, in the same manner increases the effect and can make a picture or image completely unintelligible. It is evident that by modifying the values of the six elementary voltages on the deflection plates, e.g. 0 v., 1 v., 2 v. . . . 5 v. in any desired sequence in one direction or another every 1/50 second, a normal receiver on which the displacements will appear superimposed in seeming haphazard fashion will display an image which can range from one that is so blurred as to be almost unusable to one that is completely unintelligible, depending upon the adjustment of the equipment. A receiver provided with a correct key will displace the points in inverse order or replace them in synchronism with the sending station so that a clear picture or image is produced. The replacement in synchronism with the sending station may be achieved at the receiver by a small synchronous motor which introduces voltages in synchronism and opposed to those applied at the sending station.

In FIGURE 2 cathode ray tube 4 is provided with horizontal deflecting plate 5 supplied by a high speed sawtooth generator and companion plate 6 normally connected to ground or other fixed reference potential. Vertical deflection plate 7 is connected to a relatively slow speed sawtooth generator with companion plate 8 normally connected to ground or to a fixed reference potential.

The saw tooth voltage supplied to plate 5 has a high frequency which may have a value of one or more megacycles and is preferably synthesized by the addition of sinusoidal voltages representing a fundamental and selected harmonics of suitable amplitude in accordance with the technique described in reference to FIGURE 2 of my U.S. Patent No. 2,541,134, granted February 13, 1951.

A supply plug 9 is connected to a normal rectifier circuit 10 which furnishes anode voltage for the receiver. Positive terminal 11 of the high voltage condenser of circuit 10 is connected to resistance 12 in series with group resistance 13 made up of four small series resistances 14, 14′, 14″, and 14‴. A coupling member 16 is connected to cathode ray tube 4 and provides means for sampling the voltages on plates 6 and 8 by conductors 6′ and 8′ respectively. Small synchronous motor 17 is supplied from multiple socket plug 9. In the example chosen, where the number of combinations is ten, the speed of motor 17 is five revolutions per minute.

Figure 4:
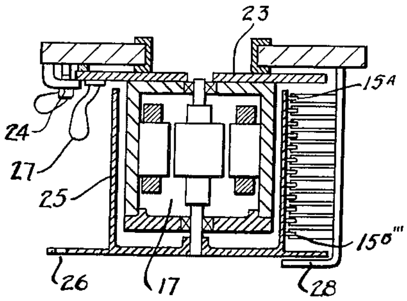
FIGURE 4 is a sectional view of the upper left portion of FIGURE 3 taken along the axis perpendicular to the plane of the paper.

Motor 17 drives a drum 25 around which is fixed a sheet of paper or the like 18 on which is imprinted bands and markings in conducting ink. Sheet 18 comprises one form of the "key" by which the receiver automatically replaces the points of image and reconstitutes a clear picture, the upper half controls the horizontal deviation and the lower half controls the vertical deviation of the electron beam of tube 4. The showing of motor 17 in FIGURE 4 is entirely schematic. Any known drive or gearing may be used to connect it with drum 25 for a satisfactory drive.

Conducting bands 19 and 20 comprise the horizontal key and are coupled, either at the left or at the right to two conducting appendices. For each vertical line of the key, which corresponds to the time of exploration, there is only one appendix which determines the value of the potential applied to the deviating electrode. Little wheels 19′ and 20′ roll on continuous bands 19 and 20, respectively, and are in electrical contact therewith. Wheels 19 and 20 are both connected to coupling 16 by common wire 6′. The potentials on conductors 15, 15′, 15″ and 15‴ tapped off the potentiometer 13 comprising small resistance 14, 14′, 14″ and 14‴ are supplied to wheels **15*a*, 15′*a*, 15″*a*, and 15‴*a* which are positioned to roll on card or paper 18 on each side of wheels 19 and 20** respectively.

The vertical key is exactly analogous and comprises two conducting bands 21 and 22 to which are coupled at the right or the left appendices in the form of small squares with only one such square per vertical line of the key. Wheels 21′ and 22′ roll on bands 21 and 22, respectively and are connected to coupling 16 by common wire 8′. Wheel 21′ has wheel **15*b* on one side and wheel 15*b*′ on the other. Wheel 22′ has wheel 15*b*″ on one side and wheel 15*b*‴ on the other. Wheels 15*b*, 15*b*′, 15*b*″ and 15*b*‴ are connected to conductors 15, 15′, 15″ and 15‴**, respectively.

Figure 3:
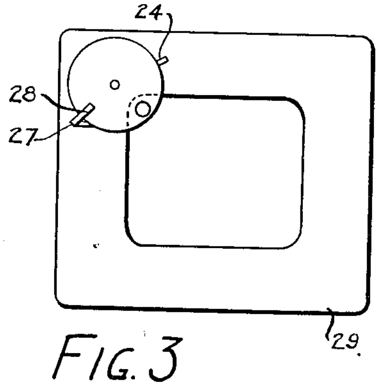
FIGURE 3 is a front elevation of a receiver showing part of one form of the invention.

All of the wheels are mounted on springs set on an arm 28 attached to a stem capable of pivoting. Rotation of arm 28 and its stem lifts all the wheels or rollers simultaneously and frees the drum 25 from its fastening means, thus unlocking it for easy removal to change the key or record 18 and for adjustment. The stator of synchronous motor 17 can be unkeyed by one tenth circumference by means of a lever 27, the position being marked by disc 23 and rachet 24. Drum 25 has a projecting flange provided with a hole 26 through which can be seen an edge or corner of the television image on the screen of cathode ray tube 4. The arrangement of these parts with respect to the front of a receiver 29 is shown in FIGURE 3. In FIGURE 4 will be seen the construction which enables drum 25 to be freed quickly. When the hook on the lower end of arm 28 is rotated, drum 25 is unlocked and the wheels are moved as a group out of contact with the key card 18.

Instead of making only one continuous displacing of the images the invention contemplates sweeping by separated points, as taught in my Patent No. 2,479,880. All the points of the image are divided into a certain number of "draught boards" or groups, each comprising a certain number of points. The image is explored as many times as there are points in each board or group. Different points are scanned in each sweeping until all the points are covered and the operation is begun again.

Figure 5:
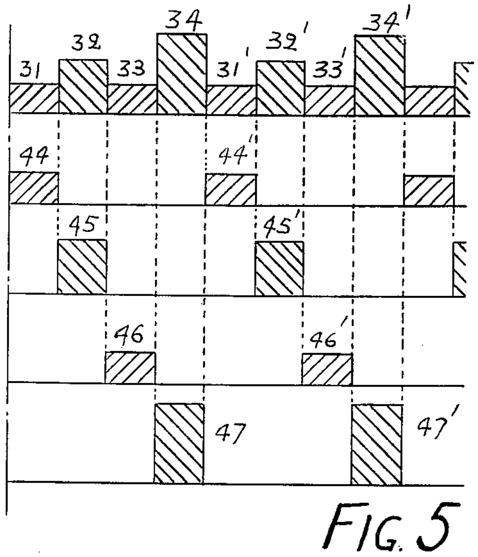
FIGURE 5 is a schematic representation of the principle of sweeping or scanning by separate discrete elemental points which may be called dot interlace scanning.

In FIGURE 5 is shown the principle of sweeping by separate points, or "cavalier" or the knight's move in chess, as disclosed in my U.S. Patent No. 2,479,880 of August 23, 1949. For this illustration it has been supposed that the duration of a point corresponded to one fourth of that of a group for the case of exploration of a group or draught board having four by four or sixteen points.

The successive voltages to be applied to the deviating plates of tube 4 are represented at 31, 32, 33, 34, 31′, 32′, 33′ and 34′. One way of reconstituting the curve represented by 31, 32, 33 and 34 is by means of a potentiometer which provides four independent values of voltage 44, 45, 46 and 47. The voltages are sampled alternately with the aid of an oscillator locked to the synchronization impulses and applied to the deflecting electrodes of tube 4. This will modify the order of the explored points according to a set sequence corresponding to the particular key 18 employed which governs the order of the operations and may under selected conditions alter the amplitude of selected voltages by the introduction of fixed impedance values carried at least in part by the material of the key 18 itself.

The above patent shows how to achieve sweeping by points crossing each other to cover a group or draught board of sixteen points. The problem there solved consists of furnishing successive voltages of exactly determined amplitude on the vertical and horizontal deflecting plates of tube 4. For example, if the order of exploration in a group or board of sixteen squares corresponds to the sequence 1, 4, 9, 16 then the choice of recurring cadence or voltage sequence is 1 v., 2 v., 3 v. and 1 v. This action may be accomplished by the simplified circuit shown in FIGURE 6 in which generator 36 produces successive rectangular signals of equal amplitude. Generator 36 is provided with several outlet circuits each of which functions to supply chosen amplitudes alternately.

The dotted ordinates intersecting the base line or abscissa in FIGURE 5 indicate corresponding periods in the voltage sequences produced by generator 36. In this form of the invention each one of the rectangular successive signals represents the required voltage for that instant of time and is produced by circuit of FIGURE 6 by means of rectifier 38 and a resistance 37. A rotating arm or commutator 39 connects rectifier 38 successively to a series of taps of different voltage level on a continuous current generator 40 which may be a battery. The voltage from battery 40 when applied to the output of generator 36 as arm 39 rotates produces the pattern of FIGURE 5 by affecting amplitude of the resultant voltage drop across resistance 42. Generator 36, which is a high frequency oscillator synchronized by the "end of the line" impulses causes a voltage to appear across resistance 41 momentarily at exactly the proper time according to the abscissa divisions shown by the dotted lines in FIGURE 5. The amplitudes of this voltage are determined by commutator 39. To achieve the effect shown in FIGURE 5, four circuits such as shown in FIGURE 6 are connected in parallel. The voltages across the four resistances 41 are alegbraically added and produce a resultant at 43 through uncoupled resistances 42.

In FIGURE 5 it will be seen that the first displacement voltage is shown by cross-hatched area 44 which represents a certain voltage level, for example, one volt, depending upon the position of commutator 39. A second voltage is indicated by hatched area 45 which is determined by another position of commutator 39 and may be for example two volts. Hatched area 46 shows a third voltage which may be the same as the first, for example, one volt, and is produced by the same position of arm 39. Hatched area 47 shows a fourth voltage which may be three volts. In the form shown, these voltages recur sequentially, e.g. 44′, 45′, 46′ and 47′ and when combined according to the teaching of the invention produce the curve represented by 31–34 inclusive which has been arbitrarily selected as the displacement key for cathode ray tube 4.

Instead of the square top step curve produced by taps off a battery, portions of sinusoidal pulses may be utilized in a number of channels. FIGURE 9 shows such pulses realized successively on independent conductors.

The curves of FIGURE 7 represent one way by which each of these different voltages values may be built up. Curve 55 indicates the normal synchronizing pulses. Curves 48 and 49 represent the output of two synchronized oscillators. Curve 50 represents the summation of curves 48 and 49. The small shaded peak portions 50′ indicate a small voltage cut off or isolated by polarized rectifiers. Peak portions 50′ form impulses of very short duration synchronized with the end of line pulses of curve 55. By using a number of conductors and impulses or the principle described above, the curve shown in FIGURE 9 with peaks 51, 52, 53 . . . is obtained. In FIGURE 8 is shown schematically the cutoff of the peak of the waves 51, 52, 53 of FIGURE 9 by the action of the series of four commutators 39, 39′, 39″ and 39‴, yielding a square flat top voltage 54 which is the counterpart of 31, 32, 33 or 34. This circuit is indicated in FIGURE 6′. Reference is made to my copending U.S. Patent No. 2,568,375, granted September 18, 1951, for clipping waves to obtain flat-top steep-sided waves closely approximating square waves. However, the actual wave shape is not critical in itself.

Figure 5A:
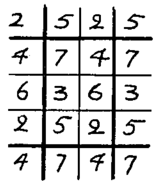
FIGURE 5A is a schematic representation of one form of interlace scanning in which the image is divided into groups or "draught boards" of six elemental image points or "squares."

FIGURE 5A illustrates the scanning of groups or "draught boards" having six elemental points. The numerals in the squares indicate one sequence of dot interlace scanning.

Figure 5B:
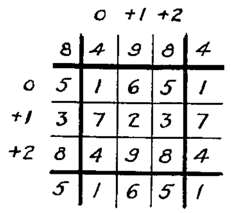
FIGURE 5B is a schematic representation of another form of interlace scanning in which nine elemental points are grouped together.

FIGURE 5B illustrates a similar group of nine elemental points. The numbers above and to the left of the roster portion indicate possible relative voltages which may be applied to the normally grounded deflection plates 6 and 8 of tube 4 to achieve the type of scanning shown. As shown, these voltage stops are 0 v., 1 v. and 2 v. corresponding to the three steps along the abscissa and the three steps along the ordinate. Accordingly, only two values of potential, 1 v. and 2 v., are necessary to provide the deflections required to cover all the points.

Figure 5C:
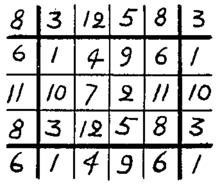
FIGURE 5C is a schematic representation of a form of interlace scanning in which twelve elemental points are grouped together.

FIGURE 5C represents a group of twelve elemental points which may be scanned in the sequence shown with three horizontal and two vertical voltage values.

Figure 5E:
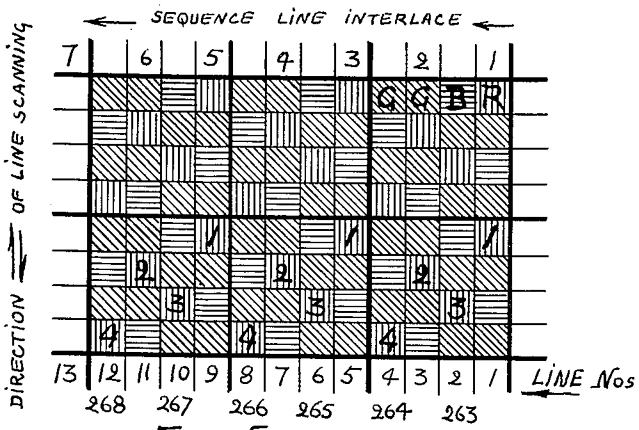
FIGURE 5E is a variant of FIGURE 5D adaptable to three color television.
Figure 5D:
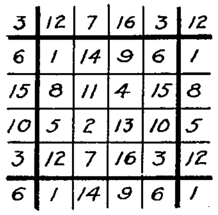
FIGURE 5D is a schematic representation of a form of interlace scanning in which sixteen elemental points are grouped together.

FIGURE 5D illustrates a group of sixteen elemental points requiring three horizontal and three vertical deflection voltage values to cover all sixteen points.

FIGURE 5E shows six groups of sixteen elemental points each and represents one form of arrangement for three color images. Note that the number of green points equals the number of red and blue combined. The scanning sequence shown in the drawing indicates the flexibility of the invention.

FIGURES 6 and 6′ show schematically a simple circuit for scanning according to FIGURES 5–5E inclusive. FIGURE 6A shows a similar apparatus for achieving the same result and derives directly from FIGURE 6.

A receiver 80 has its output connected to a separating network 81 which provides in its output three distinct channels, V, F, and L, i.e. the video signal, the frame or image synchronizing signal and the line synchronizing signal. The video signal is applied through the secondary winding of a transformer 82 to the intensity modulating grid of a cathode ray tube 83. The line synchronizing signal locks a sweep generator 84 which is connected to the deflecting plate **83*a* of the cathode ray tube 83. The output of the sweep generator 84 controls a pulse generator 85 whose output is connected to the primary of the transformer 82. The frequency of the pulse generator 85 is the same as the video frequency and its output is of such shape and amplitude in the illustrated case as to interrupt or highly pulse modulate the electron beam of the tube 83 for three-fourths of the period of the video signal. The image or frame synchronizing signal locks a sweep generator 86, the output of which is applied to the deflecting plate 83*c* of the tube 83**.

The interruption or high pulse modulation of the beam may be obtained from two sets of circularly disposed contacting members 87 and 88 and cooperating brushes 89 and 90 which are attached to rotating arms mounted on a common shaft driven by synchronous motor 91 energized by an output from the image sweep generator which rotates at a subharmonic of the image frequency. The brush 89 is connected to the deflecting plate **83*d* and the brush 90 is connected to the deflecting plate 83*b*. Tapped voltage supplies 93 and 94 are connected to contact sets 87 and 88 respectively. In the form shown in FIGURE 6A the voltage supplies 93 and 94 are each provided with two intermediate taps 93*a*, 93*b* and 94*a*, 94*b*, respectively, and are connected to the contacts so as to obtain any desired scanning pattern. For example, the scanning pattern shown in FIGURE 5D may be obtained by connecting the contacts 57 to the voltage supply 93 in the following order: ground, 93*b*, high 93*a*, 93*b*, ground, etc., and the contacts 88 are connected to the power supply 94 in the following order: ground, 94*a***, high, 94*b*, ground, high, etc. The action may be represented by the following schedule:

Order of exploration:
1:2:3:4:5:6:7:8:9:10:11:12:13:14:15:16:
Horizontal deflecting voltage:
0:1:3:2:0:3:1:0:2:3:1:0:2:1:3:2:
Vertical deflecting voltage:
0:2:3:1:2:0:3:1:0:2:1:3:2:0:1:3:

The full voltage of each of the supplies 93 and 94 is of a value to obtain a sweep increment equal to the width of the elemental area group.

In the same general way a sweep of the nine elemental area group of FIGURE 5B may be obtained from the following schedule:

Order of exploration: 1:2:3:4:5:6:7:8:9:
Horizontal deflecting voltage: 0:1:2:0:2:1:0:2:1:
Vertical deflecting voltage: 0:1:1:2:0:0:1:2:2:

The operation of the apparatus of FIGURE 6A may be arranged as follows:

When a cathode ray tube face composed of groups of sixteen elemental area as shown in FIGURE 5D is to be scanned, the coated surface of the tube face may be divided into one hundred twenty-five groups in width and one hundred groups in height. An image frequency of ninety-six may be selected for purposes of illustration. With these data, the video frequency as applied to the intensity control grid of cathode ray tube 83 would be 1,200,000 cyc./sec. and the line frequency would be 96,000 cyc./sec. The pulse frequency of the generator 85 would likewise be 1,200,000 cyc./sec. The effective drive shaft speed of synchronous motor 91 would be 96÷16 equals six revolutions per second. It follows that brushes 89 and 90 will be on one pair of contacts 87 and 88 for each image sweep.

During the image sweep where the brushes 89 and 90 register with grounded contacts 87 and 88, the elemental area corresponding to 1 in the group illustrated in FIGURE 5D will be scanned; where the brushes 89 and 90 register with the contacts 87 and 88 connected to taps 93*b* and 94*a* respectively the elemental area corresponding to 2 in the group illustrated in FIGURE 5D will be scanned, and so forth. Any desired scanning pattern and sequence may be obtained by suitably adjusting the apparatus as described above. For example the scanning pattern and nine elemental area group of FIGURE 5B may be obtained by adjusting the voltage connections of contacts 87 and 88, the speed of synchronous motor 91, and using the nine segment wheels. It will be understood that the segment connections determine the exploration sequence.

FIGURE 6B illustrates a variation which yields an automatic shift of the points of different horizontal lines with a sequence of four lines as shown in FIGURE 5E. This arrangement is particularly applicable to three color television with dot interlace scanning of red, blue and green indicated by R, B and G respectively. As shown by the scanning sequence data indicated at the bottom of FIGURE 5E all points of image are sampled in the course of two successive scannings or fields corresponding to the odd numbered lines as a group and to the even numbered lines as a group. The scanning may begin with a point R, and sequentially thereafter G, B, G, yielding the cycle: RGBGRGBGRGBG – – – – –. For best results it is of some importance that vertical lines of color be avoided. Where scanning of the first field is begun with R, the third line is preferably begun with a G dot, the R dot being shifted one unit to the right with reference to the first line. On line five the first point is again R. Line seven is again shifted one unit to the right and so on until the end of the scanning of the first field of odd numbered lines.

It will be readily understood that the scanning sequence, line interlace, direction and the like as shown in FIGURE 5E are merely illustrative and are not critical.

Other sequences and arrangements can be employed to achieve acceptable results. For example, the entire arrangement of FIGURE 5E can be rotated en bloc by ninety degrees.

During the scanning of the second field of even numbered lines, line two as indicated by the line number at the bottom of FIGURE 5E is scanned but all the points are shifted by two units to the right in comparison with line one of the first field. With the scanning of line four a further shift of one unit is made with reference to line two. Line six is then scanned in the same manner as line 2 and so on alternately to the end of the second field comprising the even numbered lines.

In the above described scanning process there is no vertical shift outside the well known line interlaced scanning which is obtained by means of an end of line signal occurring at the last half line and corresponding to an odd numbered total of lines of the image or picture. It is highly desirable to provide two degrees of phase shift in the horizontal direction. In FIGURE 6A only one means for horizontal shift is shown. For the present process there should be an alternate shift at the recurrence of each two lines: A second alternate shift which is added to the first comes into play for each field scanning corresponding to the even lines. This combination of superimposed shifts at line frequency and field frequency may be obtained by the variant of FIGURE 6 shown in FIGURE 6B which is a slight modification of FIGURE 6A.

One important application of the above described scanning process in a three color system is the combination of the dot interlace pattern of FIGURE 5 through 5E with field sequential scanning for color. That is, it is part of the present invention to so arrange the deflection voltages introduced by the circuit of FIGURE 6 or one of its several modifications, that each field is scanned in a single color, but the dots scanned follow the cavalier or dot interlace concept. This combination eliminates color crawl or involuntary movement of the eye due to retentivity of the retina and retains the sharp definition of dot interlace. For example, the segment connections of FIGURE 6B which determine the exploration sequence as explained above can control the scanning of the pattern of FIGURE 5E so that the first field is explored by scanning only selected red elements in the odd lines, the second field is explored by scanning selected green elements in the even lines, the third field is explored by scanning only selected blue elements the odd lines and the fourth field is explored by scanning other selected green elements in the even lines. As it happens in the sixteen point square with the green elements equalling the sum of the red and blue elements combined this could result in some points never being scanned. Such a disadvantage can be corrected by (*a*) using a different size group, (*b*) making the numbers of red, blue and green areas more equal, (*c*) laying the phosphors in lines, etc. Where dot color is layed the scanning by field sequential in one color can cover all the dots of that color on the lines scanned. Where solid lines of color are layed dots may be skipped in cavalier or a suitable variant. For example, using (*b*) the first field is explored by scanning red elements on the odd lines, the second field is explored by scanning the green element on the even lines, the third field is explored by scanning the blue elements on the odd lines and the fourth field is explored by scanning the red elements on the even lines, which completes a frame of image. The first field of the next frame is explored by scanning only selected green elements on the odd lines and the cycle repeats with cycle advanced one color each time.

Much of the advantage of cavalier is retained by scanning all of the areas of the same color in each field because the physical separation of the colors can itself give a cavalier effect in some degree.

FIGURE 6B retains the basic structure of FIGURES 6 and 6A. As in FIGURE 6A separating device 81 is used to obtain video signals in the first channel V, end of image signals in channel F and end of line signals in channel L. Sweep generator or relaxator 84 is synchronized with the end of line signals in channel L and supplies plate 83*a*. A second sweep generator 86 is synchronized with the field frequency F and supplies plate 83*c*. The end of line signals are also utilized to synchronize a frequency multiplier 85 which controls the grid of cathode ray tube 83 periodically at a very high frequency. This in a general way provides dot interlace scanning. In FIGURE 6B the end of field signal F synchronizes a small synchronous motor 91 which drives commutator arm 95 at a speed half that of the end of image frequency which in this case is the end of field frequency. Arm 95 rides in contact with segments 96 and 97 forming a split commutator ring. Segment 96 is connected by wire 98 to the grounded terminal of a two-volt battery 99, the other terminal of which is connected to segment 97 by wire 100. Wire 101 connects arm 95 and the grounded terminal of battery 99 and contains a resistance 102 across which appears a voltage drop constituting the output of this circuit portion.

A second small synchronous motor 103 is synchronized with end of line frequency by wire 104 and drives a second commutator arm 105 at half the speed of end of line frequency L. Arm 105 rides in contact with segments 106 and 107 forming a second split ring commutator ring. Segment 106 is connected by wire 108 to terminal 109 of a one volt battery 110 which is in turn connected to junction 111 with wire 101 by a wire 112. Terminal 109 is of opposite polarity to the grounded terminal of battery 99 to which segment 96 is connected by wire 98. Segment 107 is connected to the other terminal of battery 110 by wire 113. Arm 105 is connected to junction 114 with wire 112 by wire 115 containing resistance 116. Wire 117 leads from junction 118 with wire 115 to deflection plate 83*b* of cathode ray tube 83. It will be seen that when arm 95 contacts segment 96 resistance 102 is shunted to ground and when arm 96 contacts segment 97 resistance 102 is placed across battery 99 and has a voltage drop of substantially two volts across it as output. When arm 105 is in contact with segment 106 resistance 116 is shunted and when arm 105 contacts segment 107 resistance 116 is placed across battery 110 and has a drop of substantially one volt across it as output. It is to be noted that the D.-C. drops across resistances 102 and 116 are of opposite polarity and are additive to impose a voltage on plate 83*b*. The above two variable actions may be combined to yield the scanning pattern of FIGURE 5E as follows.

At the first line of scanning the arm 105 is at the beginning of segment 106 and arm 95 is at the beginning of segment 96. The voltage drop across resistances 102 and 116 is zero in each case. There is therefore no horizontal shift and the sampled point is the red one R in FIGURE 5E. At the end of the first line, commutator 105 passes from segment 106 to segment 107 and places resistance 116 across battery 110 causing a voltage drop of "one volt" across it which is applied to plate 83*b*, shifting all the points of the line one unit to the "right." The third line of the field is therefore scanned with a phase shift of one unit. At the end of line three commutator arm 105 leaves segment 107 and again contacts segment 106, shunting resistance 116 which then has zero drop. The phase shift is cancelled and line five is scanned in the same manner as line one. At the end of line five arm 105 again contacts segment 107 so that line 7 is scanned with a phase shift of one unit. This action continues to the end of the field of odd numbered lines.

At the end of the field of odd numbered lines commutator arm 95 passes from segment 96 to segment 97 placing resistance 102 across battery 99. The resulting drop of two volts across resistance 102 is applied to plate 83*b* causing a line shift of at least two units during the scanning of the entire even number field. That is, line two, the first line of the second field and the two hundred sixty-third lines scanned of the frame or image is shifted by two units to the "right" with respect to line one.

At the end of line two, the first line of the second field, arm 105 passes to segment 107 causing a voltage drop of one volt across resistance 116 which is of proper polarity to add to the two volts drop across resistance 102, placing three volts on plate 83*b*. Line four, the second line of the second field and the two hundred sixty-fourth line of the image, is scanned with a phase shift of three units in comparison with line one.

At the start of line six, the third line of the second field and the two hundred sixty-fifth line of the image to be scanned, arm 105 contacts segment 106 and the voltage applied to plate 83*b* drops to two volts with a corresponding shift in phase of two units. This action continues to the end of the second field and all the even lines are scanned after which the entire cycle repeats.

It is to be understood that the voltages and other values set forth in the specification are for exposition only and that actual values of all circuit constants and components are a matter for design and computation.

In FIGURE 6C the synchronous motors and commutators are replaced by stationary circuit means which produce the same effect without moving parts. Receiver-separator 120 provides video signal channel V, end of field signals channel F and end of line signal channel L. Channel V is connected to the grid of tube 83 through a suitable frequency multiplier 121. The end of line channel is connected to plate 83*c* through sawtooth generator 122 and continues to line frequency oscillator 123. The end of field signal channel leads through sawtooth generator 190 to field frequency oscillator 124. Battery 125 is the counterpart of battery 99 and supplies two volts D.C. Battery 126 is the counterpart of battery 109 and supplies one volt. The electrical counterpart of commutator 95 etc. comprises wire 127 leading from field frequency oscillator 124 to a loop having the primaries of transformers 128 and 129 in parallel and connected to one terminal of battery 125 by a wire 130. The secondary of transformer 128 is connected through a resistance 131 and rectifier 132 to junction 133. Junction 133 is grounded through a rectifier 134 connected to pass currents of opposite direction than rectifier 132. Junction 133 is connected to plate 83*d* by wire 136 containing resistance 135. Wire 137 containing resistance 138 and battery 139 connects junction 140 with wire 136 to ground through the resistance 138. The secondaries of transformers 128 and 129 are connected to wire 141 which leads to junction 142 with wire 130. Wire 143 connects battery 125 to junction 144 with wire 137. Secondary 129 is connected to ground by wire 145 containing resistance 146, reversed rectifiers 147 and 148 and battery 149. Wire 150 connects junction 151 with wire 145 between rectifiers 147 and 148 to junction 152 with wire 137 through resistance 153. Wire 154 containing resistance 155 joins wire 150 and wire 136.

The electrical counterpart of synchronous motor 103 and commutator 105 comprises end of line frequency oscillator 123 joined by wire 156 to the primaries of transformers 157 and 158 which are in parallel and connected to junction 159 with wire 136 by wire 160. The secondaries of transformers 157 and 158 are connected to one terminal of battery 126 by wire 161. The other end of the secondary of transformer 157 is grounded through resistance 162 and reversed rectifiers 163 and 164 by wire 165. Wire 166 contains resistance 167 and joins junction 168 with wire 165 to junction 169 with wire 137 above battery 139. Wire 170 connects junction 171 with wire 166 to junction 172 with wire 136.

The secondary of transformer 158 is grounded through resistance 173, reversed rectifiers 174 and 175 and battery 176 by wire 177. Wire 178 connects junction 179 with wire 177 to junction 180 with wire 166 through resistance 181. Resistance 182 connects junction 183 with wire 178 to junction 184 with wire 170.

The circuit of FIGURE 6C operates as a complete electrical counterpart of 6B in which the transformers and rectifiers apply the two volt shift from battery 125 and the one volt shift from battery 126 to plate 83*d* in the same sequence as from batteries 99 and 110.

Field frequency oscillator 124 and line frequency oscillator 123 represents a circuit complex shown schematically in dotted lines at the top of FIGURE 10 and described in detail in the copending application referred to in the discussion of FIGURE 10. Oscillator 124 produces a wave such as 48 in FIGURE 7 and oscillator 123 produces a wave such as 49; these are converted to square top waves as shown at 54 in FIGURE 8 by the action of the rectifiers. The combined action on deflection plate 83*d* is substantially that discussed in FIGURE 5B. The action of the circuit portions will be discussed below in connection with FIGURE 10 which it resembles closely.

In FIGURE 10 a television receiver-separator 200 provides the usual video channel V connected to the grid of tube 83 through frequency multiplier 201, an end of field channel F connected to plate 83*c* through sawtooth generator 202 and end of line channel L connected to plate 83*a* through sawtooth generator 203 and also to two oscillators 204 and 205 which it synchronizes at frequencies $K_1F$ and $K_2F$ respectively. Oscillators 204 and 205 have two phase output. Oscillator 204 produces a wave which is twice the frequency of the end of line signal or curve 48 in FIGURE 7 and oscillator 205 produces a wave of three times the end of line signal or curve 49 of FIGURE 7. Reference is made to my copending application S.N. 82,718, filed March 22, 1949, for "Generator of Complex Electrical Tensions Intended Notably for the Distribution of Impulses" (now Patent No. 2,685,644) for details of construction and operation of the circuit. The structure and function of the coils in the dotted rectangles of FIGURE 10 is there explained. Waves are produced at wires 206, 207 and 208 corresponding to FIGURE 9 and are cut to square top waves by the action of rectifiers 209, 210 and 211. A battery 212 is provided with four steps which supply in parallel four terminals each of quadripole switches 213, 214 and 215 which are set in accordance with any selected key. The arms of switches 213, 214 and 215 are connected, through rectifiers 216, 217 and 218 to junctions 222, 223 and 224 with rectifiers 209, 210 and 211, all respectively. Voltage drop resistances 219, 220 and 221 connect junctions 222, 223 and 224 respectively with wire 225 leading to one terminal of battery 212. Parallel resistors 226, 227 and 228 are connected respectively to junctions 222, 223 and 224 and to common wire 229 connected to deflection plate 83*d*. A stabilizing resistor 230 connects wires 225 and 229.

In operation selected voltage drops are placed across resistors 219, 220 and 221 by the key setting of switches 213, 214 and 215. The effect of the essentially Y—Y connected resistors 219, 220, 221 and 226, 227, 228 with a common return 230 on deflection plate 83*d* depends upon the square top waves supplied by rectifiers 209, 210 and 211 to junctions 222, 223 and 224. The resultant effect will be substantially that described in detail in the operation of FIGURE 6B save that it is affected by the key settings of switches 213, 214 and 215, yielding secrecy as a given TV signal will give an intelligible image only in a receiver with a properly set key.

FIGURE 11 shows one means whereby a card 250 which may be sent by mail or sold at a newsstand can be used as a key. A holder 251 is hinged on at 252 and is provided with a series of contact bars 253, 254, 255 and 256 tapped off battery 212. Top 257 of holder is provided with a number of voltage drop resistors 258, 259, etc. which are connected to corresponding junctions 222, 223, 224, etc. Card 250 is of insulating material and perforated as at 265 with a series of key holes, no more than one hole for each resistance 258, 259, etc. Where top 257 is closed, resistors 258, 259, etc. are pressed through the holes 265 and produce voltage values at junctions 222, 223, 224, etc. which are the counterpart of those produced by switches 213, 214 and 215.

It will be understood that the structure of FIGURES 6 through 6C and 10 may be utilized to produce secrecy of image alone or in conjunction with the discontinuous dot interlace scanning system of my U.S. Patent No. 2,479,880 or, if desired, they can be constructed to produce adjustable discontinuous dot interlace scanning without the use of a separate mailable key or without secrecy. Adjustable discontinuous dot interlace scanning, described above, can be made automatically variable as discussed in my copending application Serial No. 237,372 for "Variable Discontinuous Interlaced Scanning System" (now abandoned).

While there have been described above certain illustrative embodiments of the invention, they are not intended to be limiting. The invention may be embodied in structures of varying forms and such as fall within its spirit are intended to be covered by the claims in which the several elements of the inventive combination are set forth in terms of varying breadth, some being generic and others specific in character and are intended to be so construed.

I claim:

1. An electron beam scanning system, comprising an explored surface defined by a plurality of groups of at least four substantially equal elemental areas extending along two coordinates, an electron gun for generating an electron scanning beam, a deflecting circuit for directing said beam along said coordinates in synchronism with a line and a field sequence, receiving antenna means connected to said system, control circuit means for both said gun and deflecting circuit, means connected to said electron gun to supply thereto modulating signals for said beam including signals producing periodical decreases in primary electron content of said beam from at least one of said means, said periodical decreases produced by said modulating signal means temporarily reducing the light producing effect of said beam on said surface to a non-interfering value, means to synchronize the deflecting voltages in said deflecting circuit and said periodical decreases in primary electron content of said beam so that a corresponding elemental area in each of said groups is scanned during each field and that different elemental areas in each group are scanned during successive ones of said fields, said deflecting circuit having an auxiliary circuit connected thereto constructed to supply substantially square top supplementary signals to said deflecting circuit in a predetermined sequence, said auxiliary circuit having control modulator means as a part thereof.

2. The combination set forth in claim 1, said control modulator means having a commutator means comprising movable switching elements connected to alter the amplitude of said individual displacement voltages in accordance with a selected key arrangement.

3. The combination set forth in claim 1, small portable key means having circuit affecting means thereon arranged to react with circuit elements of said auxiliary circuit and determine the timing of said supplementary signals and means associated with said auxiliary circuit for placing said key means in operative relation to said auxiliary circuit.

4. The combination set forth in claim 1, said auxiliary circuit having two networks for producing said square top waves as step voltages, said system having an end of line frequency oscillator connected to one of said networks and an end of field frequency oscillator connected to the other of said networks.

5. The combination set forth in claim 1, said bodily movable member comprising a separable readily portable control element comprising a body member having charged particle control circuit path affecting means spatially arranged in a predetermined patterned sequence on said body member as an integral part thereof for affecting the effective sequence and position of contact of charged particles on the face of said tube to form a picture thereon.

6. An electron beam scanning system, comprising an explored surface defined by a plurality of groups of at least four substantially equal elemental areas extending along two coordinates, an electron gun for generating an electron scanning beam, a deflecting circuit for directing said beam along said coordinates in synchronism with a line and a field sequence, receiving antenna means connected to said system, control circuit means for both said gun and deflecting circuit, said electron gun being connected to receive modulating signals for said beam including signals producing periodical decreases in primary electron content of said beam from at least one of said means, said periodical decreases temporarily reducing the light producing effect of said beam on said surface to a non-interfering value, means for so synchronizing the deflecting voltages in said deflecting circuit and said periodical decreases in primary electron content of said beam that a corresponding elemental area in each of said groups is scanned during each field and that different elemental areas in each group are scanned during successive ones of said fields, each group of elemental areas containing at least two areas coated with phosphors of different colors, said deflecting circuit being so constructed that the elemental areas scanned in any one field are substantially all of one color; said deflecting circuit having beam deflecting plates and an auxiliary circuit connected thereto for supplying supplementary pulse signals to said deflecting plates in a predetermined sequence and superimposed upon the normal displacement signals supplied to said deflecting circuit, said auxiliary circuit comprising a line frequency oscillator and a field frequency oscillator for producing waves bearing a simple numerical relation to the line and field frequencies respectively and means for clipping said waves to produce substantially square top waves comprising said supplementary pulse signals.

7. In combination in a television receiver having a picture producing circuit employing controlled charges to activate a viewing screen and produce program images thereon, a control key, means to receive said control key, circuit means operatively associated with said means to receive said control key and responsive to said control key and affecting said picture producing circuit to produce clear images of at least selected programs, said key having a body member at least a portion of which is insertable in said means to receive to produce clear picture images.

8. The combination set forth in claim 7, said viewing screen comprising elemental picture areas which may be independently illuminated, said picture producing circuit and said circuit means cooperating to illuminate said elemental areas in a desired sequence, said control key being so constructed that upon insertion into said means to receive it operates to change said sequence of illumination of said elemental areas.

9. The combination set forth in claim 7, said control key body member comprising a card-like element capable of being inserted bodily into said means to receive said control key.

10. The combination set forth in claim 9, said card-like element comprising insulating material having holes formed in said card in a spatially arranged predetermined patterned sequence.

11. The combination set forth in claim 10, said means to receive said control key comprising a card holder mounted on said receiver and having contact means for projecting through said holes to impress selected voltages sequentially on said circuit means which in turn applies said selected voltages sequentially to said picture producing circuit.

12. The combination set forth in claim 11, said picture producing circuit comprising part of a cathode ray tube having an electron beam, a local battery having a plurality of stepped taps for supplying said selected voltages in predetermined sequential steps to the deflecting plates of said tube, said viewing screen being part of said cathode ray tube, said viewing comprising elemental picture areas having means producing different colors, said picture producing circuit and said circuit means associated therewith being constructed to respond to a plurality of signals representing different colors and having means to separate said signals representing different colors whereby to energize appropriate elemental areas on said viewing screen in response to said signals.

13. A television system comprising picture means, said picture means comprising a plurality of groups of elemental areas, means to scan said elemental areas in course of successive fields, said means to scan comprising means for selecting different elemental areas in successive groups to be scanned, each group having the same number of elemental areas, said groups being arranged in horizontal and vertical alignment and readily changeable circuit affecting means for determining the order of scanning the elemental areas in the course of successive fields comprising a control element having charged particle path controlling means for providing a predetermined patterned sequence and position of contact of charged particles on a picture producing area of said picture means to form a picture thereon.

14. A television system comprising picture means, said picture means comprising a plurality of groups of elemental areas, means to scan said elemental areas in course of successive fields, said means to scan comprising means for selecting different elemental areas in successive groups to be scanned, each group having the same number of elemental areas, said groups being arranged in horizontal and vertical alignment and record means for determining the order of scanning the elemental areas in the course of successive fields, said record comprising an arrangement of means whereby only one elemental area is scanned in each group per field, said arrangement of means comprised by said record means representing discrete displacement values corresponding to the respective coordinates of the respective elemental areas of the groups, a source of a plurality of discrete voltages, means to supply said discrete voltages to two groups of brushes for vertical and horizontal selection of an elemental area within the group; said picture means comprising a cathode ray tube, said record controlling the application of said discrete voltages to the vertical and horizontal beam displacement means of said tube by said brushes; in which said record means comprises a removable card having spaced perforations therein, each group comprising elemental areas having phosphors producing different colors of light, said record means comprising a removable key having a physical arrangement and condition such that it determines the order of scanning of said elemental areas.

15. A television system comprising picture means, said picture means comprising a plurality of groups of elemental areas, means to scan said elemental areas in course of successive fields, said means to scan comprising means for selecting different elemental areas in successive groups to be scanned, each group having the same number of elemental areas, said groups being arranged in horizontal and vertical alignment and readily adjustable means for determining the order of scanning the elemental areas in the course of successive fields said elemental areas comprising means producing different colors, said means to scan being constructed to respond to a plurality of signals representing different colors and having means to separate said signals representing different colors whereby to energize appropriate elemental areas on said picture means in response to said signals.

16. The combination set forth in claim 15, said readily adjustable means comprising a removable key for determining the order of scanning of said elemental areas.

17. A readily exchangeable electric circuit affecting control key for a television system having a picture tube illuminated by charged particles and a control circuit for determining the path taken by charged particles to illuminate the picture tube, comprising a body member, charged-particle-control-circuit affecting means physically arranged in a preselected manner as a part of said body member and bodily movable therewith for affecting the control circuit of a picture tube in a manner and sequence determined by the physical arrangement of said means, said body member and said means being readily associated electrically with the control circuit of a picture tube to be controlled to superpose a predetermined sequence of voltages represented by the arrangement of said means on said body member upon the normal control voltages applied to a picture tube.

18. The combination set forth in claim 17, said body member comprising a mailable card-like element capable of being placed in control relation with a portion of the control circuit of a television tube.

References Cited in the file of this patent

UNITED STATES PATENTS

| | | |
|---|---|---|
| 1,379,905 | Down | May 31, 1921 |
| 2,251,525 | Rosenthal | Aug. 5, 1941 |
| 2,301,521 | Cawein | Nov. 10, 1942 |
| 2,353,061 | Oldenboom | July 4, 1944 |
| 2,389,646 | Sleeper | Nov. 27, 1945 |
| 2,402,058 | Loughren | June 11, 1946 |
| 2,424,998 | Nyquist | Aug. 5, 1947 |
| 2,472,774 | Mayle | June 7, 1949 |
| 2,479,880 | Toulon | Aug. 23, 1949 |
| 2,501,274 | Hamilton | Mar. 21, 1950 |
| 2,515,613 | Schoenfeld | July 18, 1950 |
| 2,547,598 | Roschke | Apr. 3, 1951 |
| 2,570,775 | De Baun | Oct. 9, 1951 |
| 2,656,410 | Herrick et al. | Oct. 20, 1953 |
| 2,705,740 | Druz | Apr. 5, 1955 |
| 2,705,741 | Griffin | Apr. 5, 1955 |

FOREIGN PATENTS

| | | |
|---|---|---|
| 705,689 | France | July 28, 1931 |
| 860,481 | France | Sept. 30, 1940 |

OTHER REFERENCES

"American Telegraphy and Encyclopedia of the Telegraph" (A.T.), published by Maver Publishing Co., 1912, pp. 296–300. (Copy in Div. 41.)